(12) United States Patent
Udou et al.

(10) Patent No.: US 6,318,501 B1
(45) Date of Patent: Nov. 20, 2001

(54) TRANSMISSION LUBRICATION ARRANGEMENT

(75) Inventors: Hideo Udou; Kyoji Kitajima; Kiyokazu Ohkubo; Toshiharu Kumagai, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,386

(22) Filed: Feb. 18, 2000

(30) Foreign Application Priority Data

Feb. 22, 1999 (JP) .................................................. 11-042840

(51) Int. Cl.$^7$ .................................................. F16H 57/04
(52) U.S. Cl. ............................................. 184/6.12; 74/467
(58) Field of Search ................... 184/6.12, 11.3; 475/159, 161; 74/467

(56) References Cited

U.S. PATENT DOCUMENTS

| | | | |
|---|---|---|---|
| 4,222,283 | * | 9/1980 | Nagy .................................. 184/6.12 |
| 4,590,820 | * | 5/1986 | Hambric .............................. 74/467 |
| 4,644,815 | * | 2/1987 | Kawano et al. ..................... 184/6.12 |
| 4,899,851 | * | 2/1990 | Falzoni et al. ...................... 184/6.12 |
| 4,961,669 | * | 10/1990 | Itoh et al. ........................... 184/6.12 |
| 4,987,974 | * | 1/1991 | Crouch ............................... 184/6.12 |
| 5,158,152 | * | 10/1992 | Nemoto et al. ..................... 184/6.12 |
| 5,372,213 | * | 12/1994 | Hasebe et al. ...................... 184/6.12 |
| 5,456,129 | * | 10/1995 | Tane et al. .......................... 184/6.12 |
| 5,989,143 | * | 11/1999 | Bell et al. ........................... 184/6.12 |

FOREIGN PATENT DOCUMENTS 7-68894   7/1995 (JP) .

* cited by examiner

Primary Examiner—David A. Bucci
Assistant Examiner—Chong H. Kim
(74) Attorney, Agent, or Firm—Armstrong, Westerman, Hattori, McLeland & Naughton, LLP (57) ABSTRACT

In a transmission, an oil chamber is formed between one end of an input shaft and one end of an output shaft which ends are facing each other. A first oil guide is provided at the end of the input shaft such that the cylindrical portion of the first oil guide is positioned in a lubrication passage which is provided in the input shaft. In the same way, a second oil guide is provided a: the end of the output shaft such that the cylindrical portion is provided at the end of the output shaft such that the cylindrical portion of the second oil guide is positioned in a lubrication passage which is provided in the output shaft. In addition, the input shaft is provided with a release passage which opens to the outside of the input shaft while the output shaft is provided with a release passage which opens to the outside of the output shaft. With this arrangement, lubrication oil is supplied sufficiently to members such as bearings and gears which are disposed on these rotating shafts.

6 Claims, 13 Drawing Sheets

TRANSMISSION LUBRICATION ARRANGEMENT

BACKGROUND OF THE INVENTION

1. Field of the Invention

The present invention relates generally to a transmission lubrication arrangement and, more particularly, to an arrangement that promotes efficient lubrication of mechanical elements such as bearings and gears which are disposed on rotational shafts for power transmission.

2. Description of the Related Art

In the prior art, the lubrication of a transmission, especially for supplying lubrication oil to bearings, gears, etc., which are provided around rotational shafts for power transmission, is realized by providing axially extending passages in the respective rotational shafts and by providing radially extending passages to lead lubrication oil from these axially extending passages to the outer surfaces of the respective shafts. in this arrangement, lubrication oil discharged from a hydraulic pump is supplied to oil passages which are connected to the respective axially extending passages. in some cases, these passages are provided additionally with partition walls which include orifices to control the flow of lubrication oil (for example, refer to Japanese Patent Publication No. H7 (1995)-68894 (B). lubricate bearings, gears, etc., which are disposed on the shafts, by the force produced from the discharge pressure of the hydraulic pump and by the centrifugal force generated from the rotation of the shafts.

However, this type of arrangement or method is not very effective for supplying a sufficient amount of lubrication oil to the bearings, gears, etc., disposed on the input shaft and the output shaft which are arranged with one end of one of these shafts facing one end of the other shaft. The reason is hat, because of this structural arrangement, the flow of lubrication oil through the passage which is located between these two shafts tends to be disrupted. A front engine rear wheel drive transmission (FR drive transmission) is an example of a transmission which has such a structural arrangement.

SUMMARY OF THE INVENTION

It is an object of the present invention to provide a lubrication arrangement which makes it possible to supply a sufficient amount of lubrication oil to mechanical elements, such as bearings and gears, which are disposed on two rotational shafts of a transmission in which one end of one of these shafts faces one end of the other shaft.

The present invention provides a lubrication arrangement for a transmission which incorporates first and second rotational shafts (e.g., the input shaft 11 and the output shaft 13 of the embodiment described in the following section) disposed with one end of the first rotational shaft facing one end of the second rotational shaft. This lubrication arrangement comprises a first lubrication passage (e.g., the lubrication passage 111 of the following embodiment), a second lubrication passage (e.g., the lubrication passage 131 of the following embodiment), a conduit (e.g., the oil passages 203 and 204 of the following embodiment) an oil chamber. The first lubrication passage is provided extending axially inside the first rotational shaft with an opening at the end thereof which faces the aforementioned end of the second rotational shaft. the second lubrication passage is provided extending axially inside the second rotational shaft with an opening at the end thereof which faces the end of the first rotational shaft. The conduit leads lubrication oil that is supplied from a source of lubrication oil to a space between the two openings of the first and second rotational shafts. The oil chamber is provided between the two openings and functions as a point where the lubrication oil led therein through the conduit is portioned out to the first lubrication passage and to the second lubrication passage.

In this arrangement, for supplying lubrication oil into the lubrication passages of these two shafts, lubrication oil is first led into the oil chamber, which is provided between the opposing ends of the first and second rotational shafts, and then into the first and second lubrication passages, respectively. The lubrication oil supplied to the first lubrication passage is then discharged, by the centrifugal force generated from the rotation of the first rotational shaft, to the outside of the first rotational shaft through a release passage which extends from the first lubrication passage and opens at the outer surface of the first rotational shaft. In the same way, the lubrication oil supplied to the second lubrication passage is then discharged by the centrifugal force generated from the rotation of the second rotational shaft to the outside of the second rotational shaft through a release passage which extends from the second lubrication passage and opens at the outer surface of the second rotational shaft. This lubrication arrangement can be incorporated successfully in a transmission which comprises two rotational shafts which are disposed one end of one shaft facing one end of the other shaft, to lubricate effectively and sufficiently such rotational members as bearings and gears which are disposed on these two shafts.

In the above lubrication arrangement, it is preferable that the oil chamber be formed such that it can portion out the lubrication oil led therein through the conduit to the first lubrication passage and to the second lubrication passage at a predetermined ratio. With this arrangement, a transmission which has such members as bearings and gears disposed on the first rotational shaft and the second rotational shaft unevenly can be lubricated effectively by determining an appropriate ratio for the amounts of lubrication oil supplied into the first lubrication passage and into the second lubrication passage. Moreover, because a lubrication system according to the present invention can supply lubrication oil both to the first and second lubrication passages of the first and second rotational shafts by supplying lubrication oil only into the oil chamber, the present invention successfully provides a transmission which is more compact in construction than a prior-art transmission.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
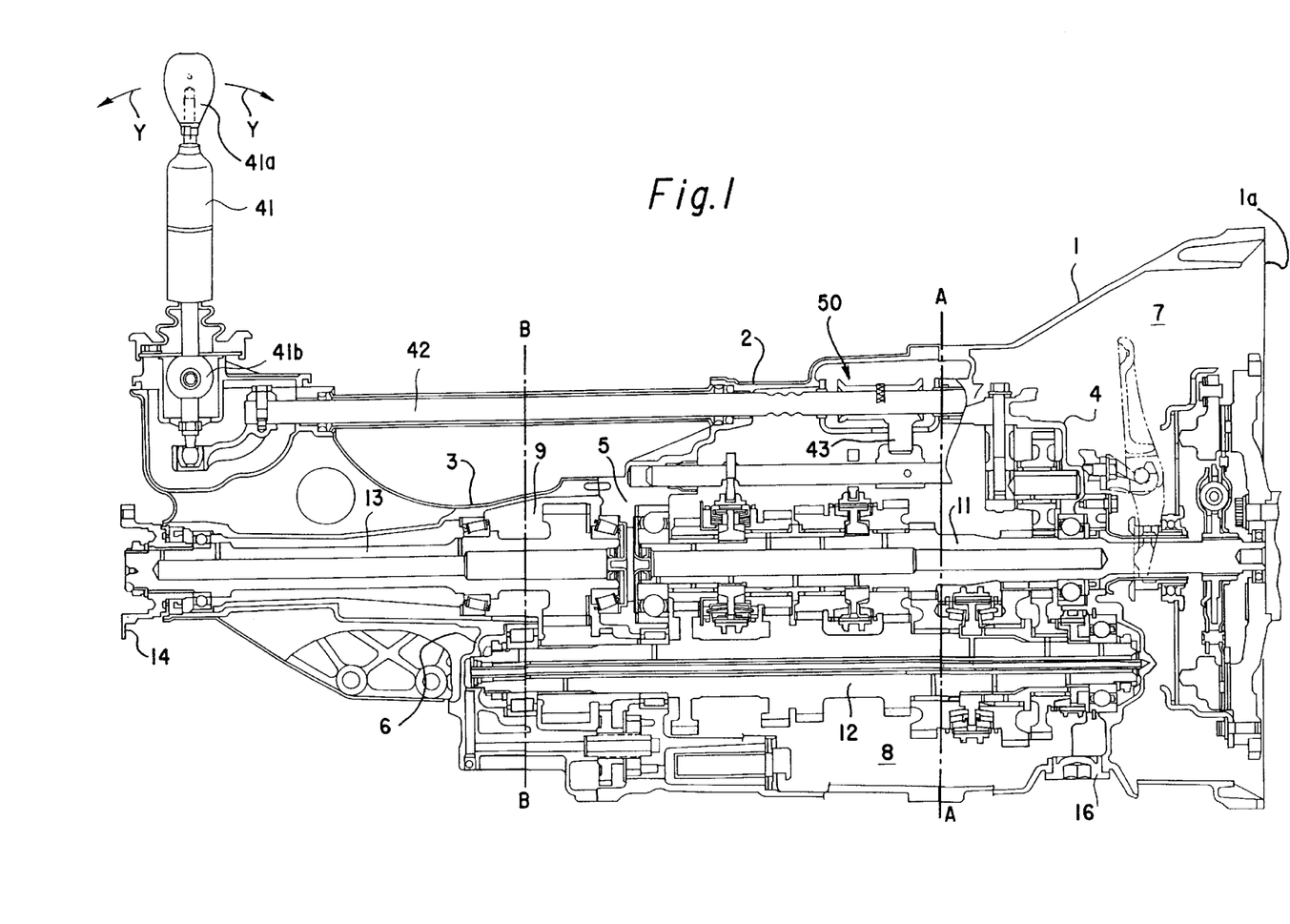
FIG. 1 is a sectional view showing the construction of a countershaft transmission, which incorporates a lubrication arrangement according to the present invention.
Figure 2:
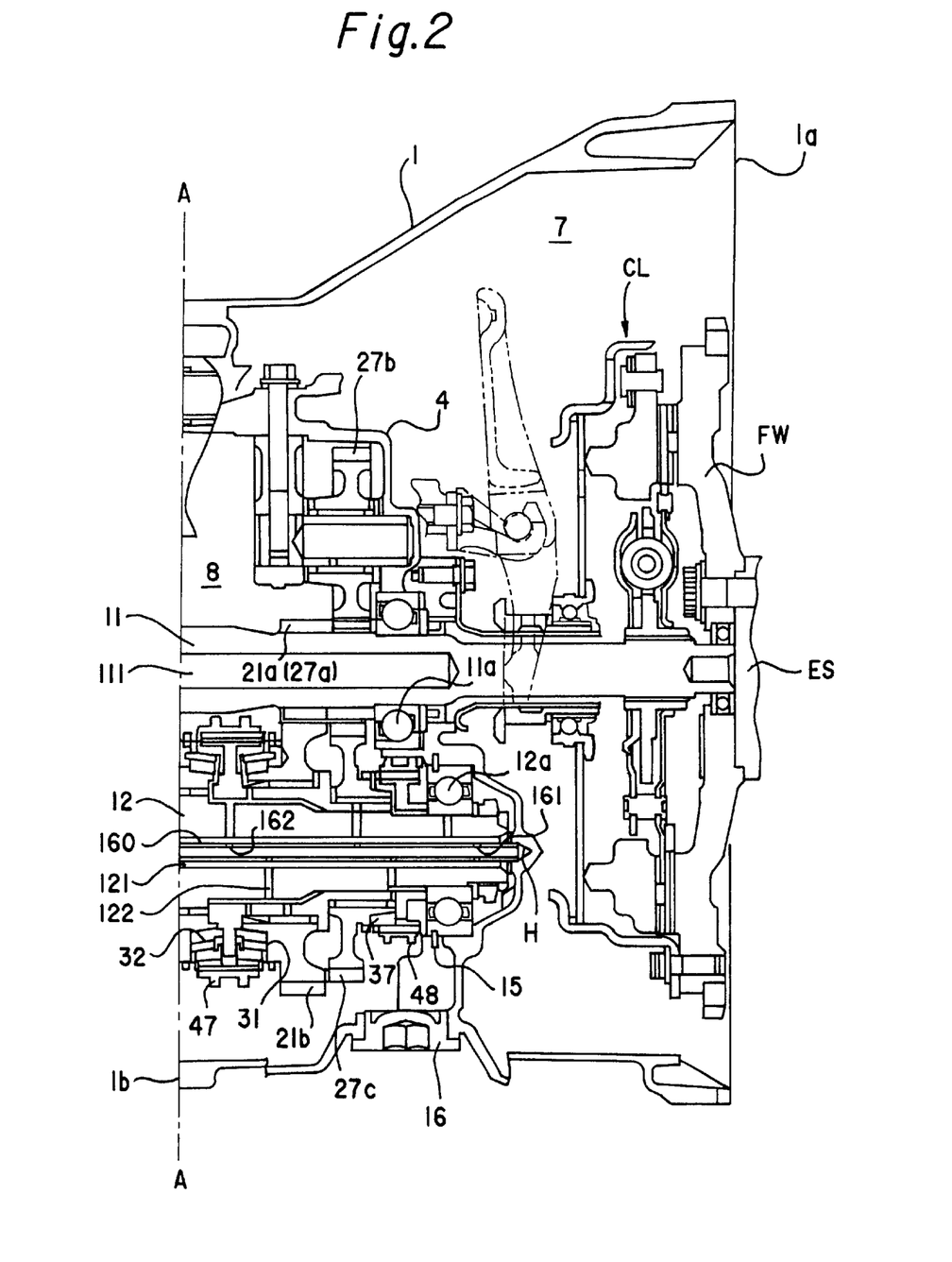
FIG. 2 is an enlarged sectional view showing the right side section of the transmission.
Figure 3:
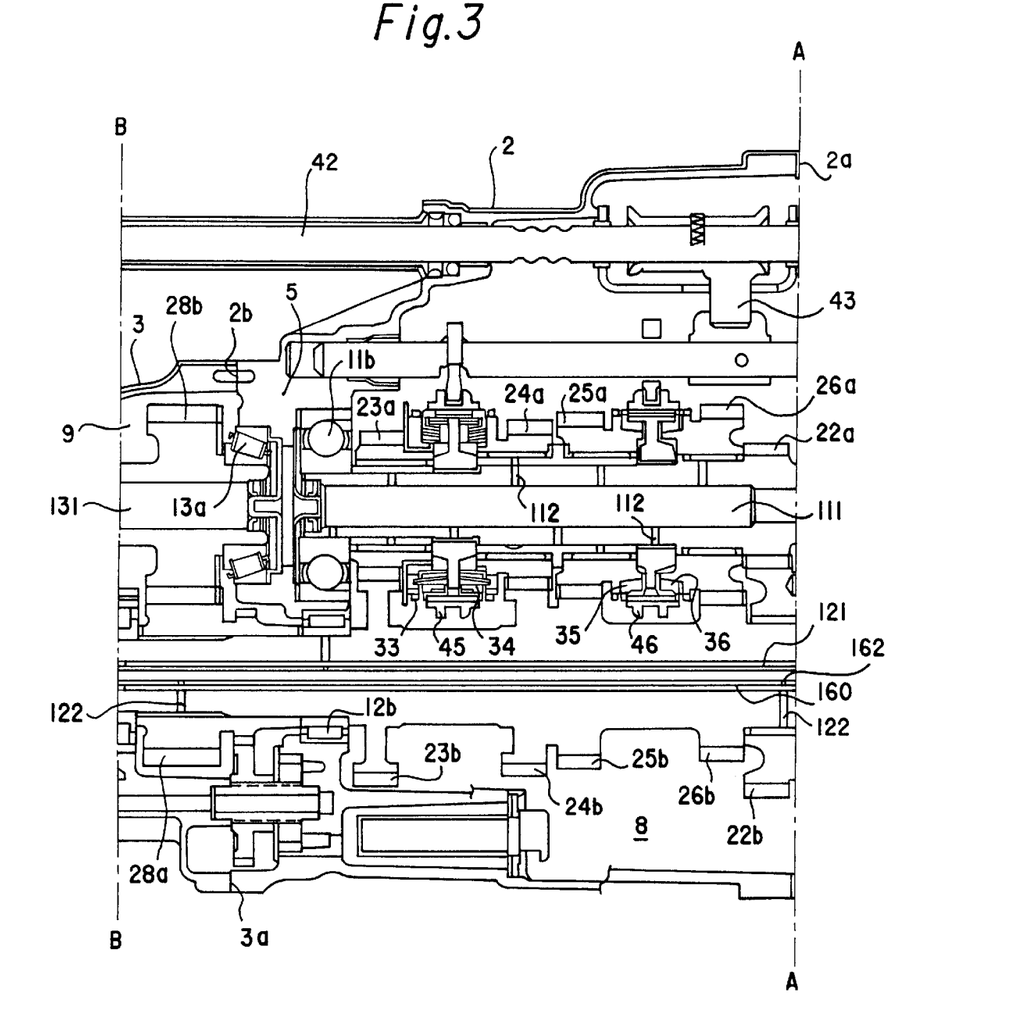
FIG. 3 is an enlarged sectional view showing the central section of the transmission.
Figure 4:
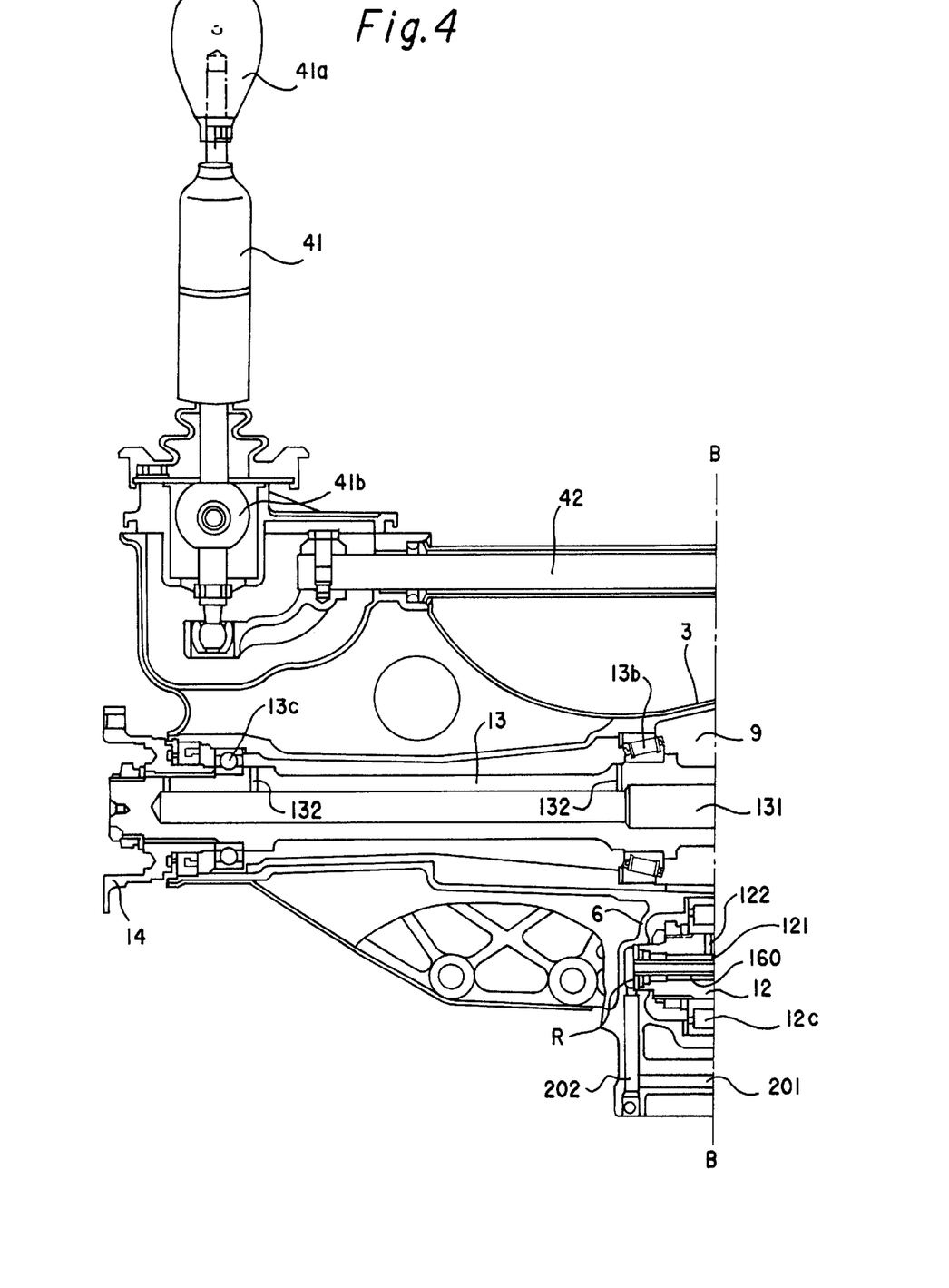
FIG. 4 is an enlarged sectional view showing the left side section of the transmission.

FIGS. 1, 2, 3 and 4 show the construction of a countershaft transmission which incorporates a lubrication arrangement according to the present invention. FIGS. 2, 3 and 4 are enlarged views of the respective three sections of the transmission divided by alternate long and short dash lines A—A and B—B in FIG. 1. In these drawings, hatching is not rendered intentionally to make the structure of the transmission more easily understandable.

In this transmission, a gearshift is disposed in a unified transmission case of first, second and third casings 1, 2 and 3, which are connected firmly consecutively from the side where an engine is placed. The first casing 1 includes a first partition wall 4, the second casing 2 includes a second partition wall 5, and the third casing 3 includes a cover wall 6 on the left side thereof, i.e., on the side opposite to the side where the engine is located. Furthermore, a main clutch CL is disposed in a clutch room 7 which is provided on the right side of the first partition wall 4, i.e., on the side toward the engine, and the right side end face 1a of the first casing 1 is connected to a casing which accommodates the engine. Furthermore, a flying wheel FW is provided in the clutch room 7 and is connected to the output shaft ES of the engine, and the above mentioned main clutch CL is mounted on the flying wheel FW.

The left side end face 1b of the first casing 1 is fixed with the right side end face 2a of the second casing 2, and a first room 8 is defined by the first partition wall 4 of the first casing 1 and the second partition wall 5 of the second casing 2. In this room, an input shaft (first shaft) 11 and a countershaft (second shaft) 12 are disposed parallel with each other, and a total of seven gear trains used for speed change are disposed between these two shafts.

The right side of the input shaft 11 is supported rotatably by a bearing 11a, which is retained in the first partition wall 4, and the input shaft 11 extends further rightward through the first partition wall 4 into the clutch room 7 and the right end thereof is connected to the main clutch CL, which connects and disconnects the power transmission from the engine output shaft ES to the input shaft 11. The left side of the input shaft 11 is also supported rotatably by a bearing 11b, which is retained in the second partition wall 5. On the other hand, the right end of the countershaft 12 is supported rotatably by a bearing 12a, which is retained in the first partition wall 4. The left side of the countershaft 12 is supported rotatably by a bearing 12b, which is retained in the second partition wall 5, and the countershaft 12 extends further leftward through the second partition wall 5. To retain the bearing 12a in the first partition wall 4, a snap ring 15 is provided around the bearing 12a, and to place and remove this snap ring 15, an opening is provided on the lower side of the first casing 1, with a cap 16 covering the opening.

The left side end face 2b of the second casing 2 is fixed with the right side end face 3a of the third casing 3, and a second room 9 is defined by the second partition wall 5 and the cover wall 6. The left side of the countershaft 12, which passes through the second partition wall 5 as described above, extends into the second room 9, and in parallel with this countershaft 12, an output shaft (third shaft) 13 is disposed in the second room 9. Between these two shafts 12 and 13, a gear train 28a and 28b is disposed, and the gears constituting this gear train are mounted on these shafts respectively and mesh with each other. The left end of the countershaft 12 is supported rotatably by a bearing 12c, which is retained in the cover wall 6. On the other hand, the right end of the output shaft 13 is supported rotatably by a bearing 13a, which is retained in the second partition wall 5. The central part and the left end of the output shaft 13 are supported also rotatably by bearings 13b and 13c, respectively, which are retained in the cover wall 6. More specifically, the left end of the output shaft 13 passes through the cover wall 6 and protrudes outward, and this protruding portion 14 is connected to a propeller shaft, which is then connected to drive wheels.

The above mentioned seven speed change gear trains, which are disposed parallel with one another between the input shaft 11 and the countershaft 12 in the first room 8, are a REVERSE gear train 27a, 27b and 27c, a LOW gear train 21a and 21b, a SECOND gear train 22a and 22b, a SIXTH gear train 26a and 26b, a FIFTH gear train 25a and 25b, a FOURTH gear train 24a and 24b, and a THIRD gear train 23a and 23b respectively from the right side in the axial direction.

The LOW and SECOND gear trains comprise drive gears 21a and 22a, which are fixed on the input shaft 11, and driven gears 21b and 22b, which are mounted rotatably on the countershaft 12 and mesh with the drive gears 21a and 22a, respectively. To connect and disconnect the driven gears 21b and 22b to and from the countershaft 12 rotationally, synchro-mesh LOW and SECOND clutches 31 and 32 are provided, respectively. The engagement and disengagement of these clutches 31 and 32 are carried out by shifting a LOW or SECOND synchro-sleeve 47 in the axial direction. The REVERSE gear train comprises a drive gear 27a, which is fixed on the input shaft 11, an idle gear 27b, which is supported rotatably on the first partition wall 4 and meshes with the drive gear 27a, and a driven gear 27c, which is mounted rotatably on the countershaft 12 and meshes with the idle gear 27b. To connect and disconnect the driven gear 27c to and from the countershaft 12 rotationally, a synchro-mesh REVERSE clutch 37 is provided there, and the engagement and disengagement of the clutch 37 is carried out by shifting a REVERSE synchro-sleeve 48 in the axial direction.

The THIRD, FOURTH, FIFTH and SIXTH gear trains, respectively, comprise drive gears 23a, 24a, 25a and 26a, which are mounted rotatably on the input shaft 11, and driven gears 23b, 24b, 25b and 26b, which are fixed on the countershaft 12 and mesh with the drive gears 23a~26a. To connect and disconnect the drive gears 23a~26a to and from the input shaft 11 rotationally, synchro-mesh THIRD, FOURTH, FIFTH and SIXTH clutches 33, 34, 35 and 36 are provided, respectively. The engagement and disengagement of these clutches 33~36 are carried out by shifting a THIRD or FOURTH synchro-sleeve 45 or a FIFTH or SIXTH synchro-sleeve 46 in the axial direction.

In this transmission, a gear change or a change of speed change ratio is carried out by selectively engaging one of the LOW, SECOND, THIRD, FOURTH, FIFTH, SIXTH and REVERSE clutches 31~37 to realize a power transmission through a corresponding speed change gear train. This gear change is performed by a driver who manipulates a shift lever 41, which is provided at the driver's seat. The mechanism to realize the shifting functions as follows.

The shift lever 41 is supported by a spherical joint 41b, so that it can swing right and left and back and forth. The driver grips a shift knob 41b, which is provided at the upper end of the shift lever 41, and moves it back and fourth (in "Y" direction, which is the direction indicated by arrows Y in FIG. 1) or right and left (in the direction perpendicular to the paper carrying FIG. 1, which direction is hereinafter designated as "X" direction). The movement of the shift lever 41 is conveyed to a main shift rod 42. The swing of the shift lever 41 in the X direction rotates the main shift rod 42 while the swing of the shift lever 41 in the Y direction transfers the main shift rod 42 in the axial direction (the right and left direction in the figure) A selector arm 43 is fixed on the other end of the main shift rod 42, and when the shift lever 41 is moved in the X direction, the front end of the selector arm 43 is led into the engaging groove of one of a plurality of shift pieces, which will be described below.

Figure 5:
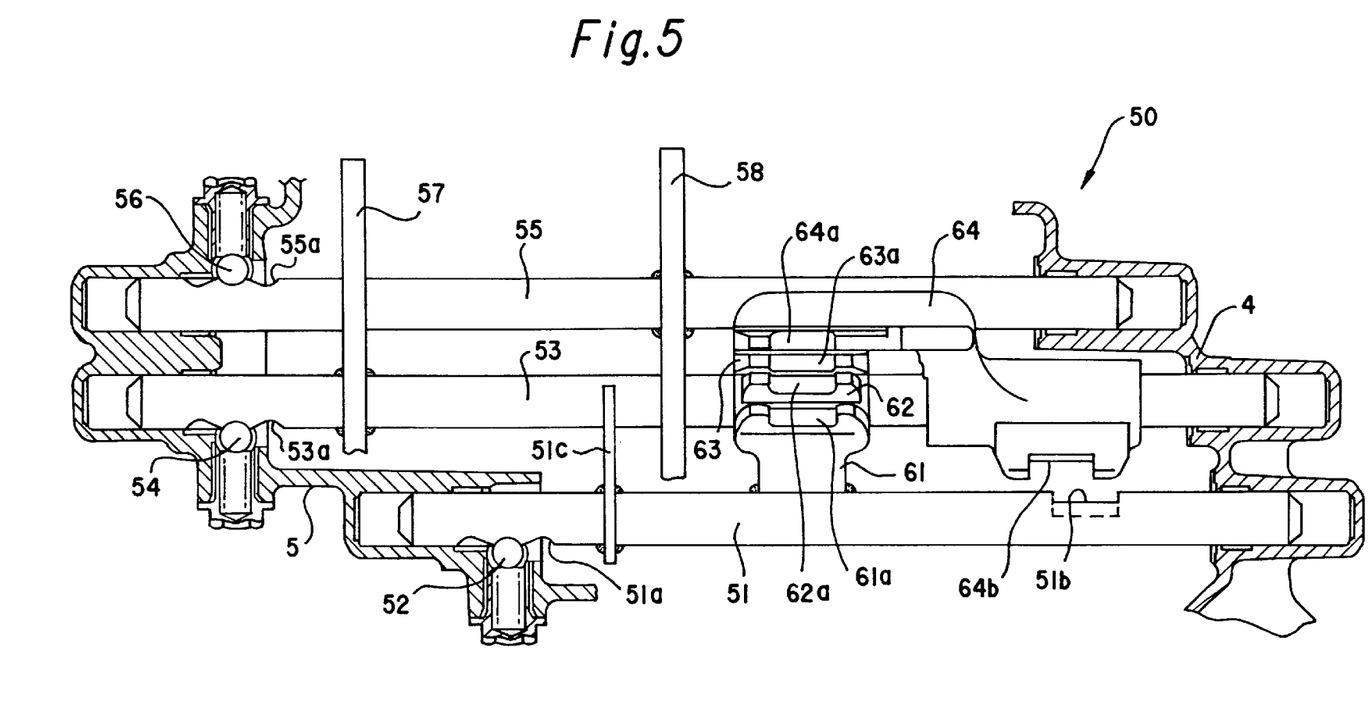
FIG. 5 is a sectional plan view showing a mechanism which conveys the shifting force in the transmission.
Figure 6:
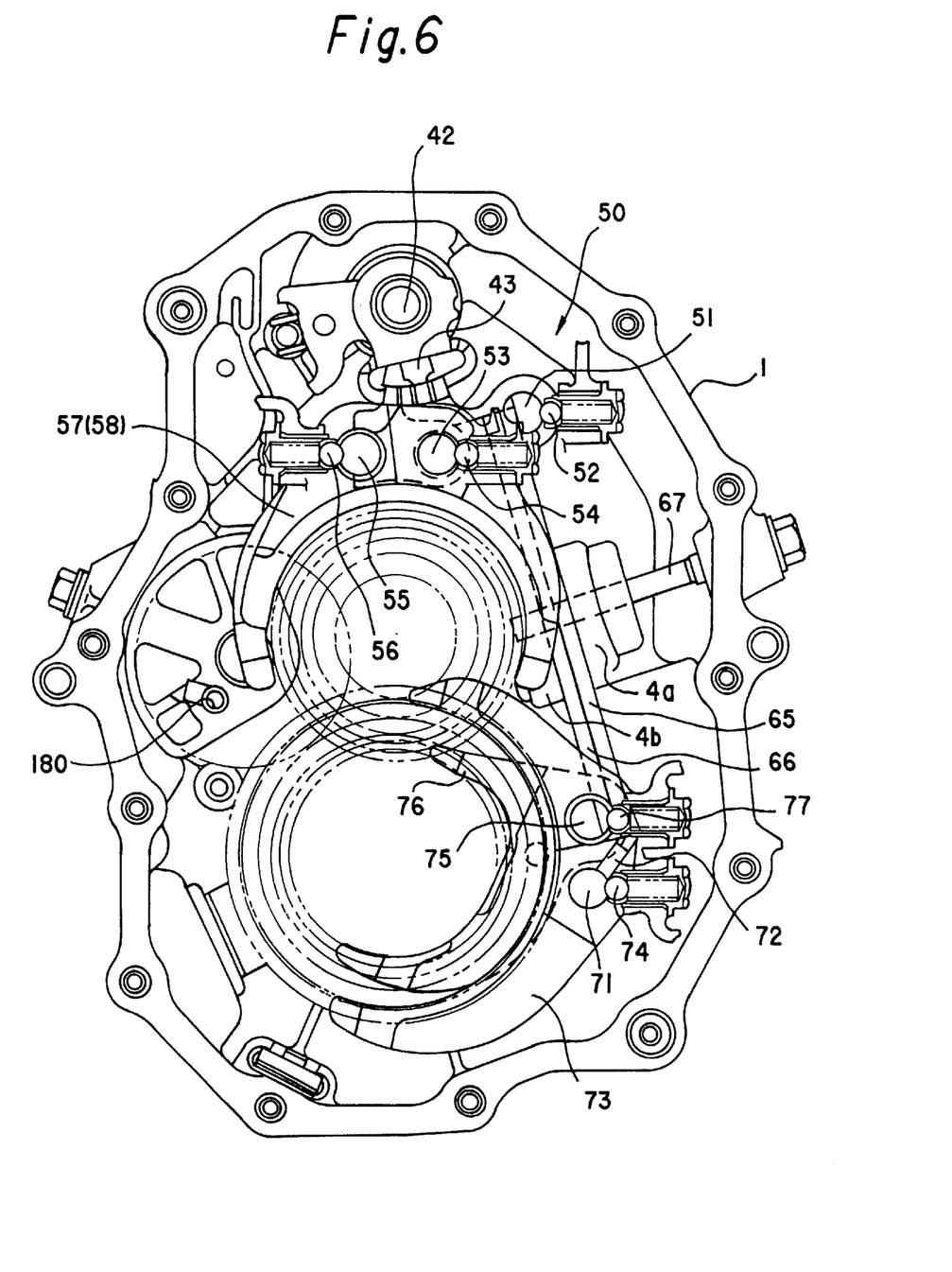
FIG. 6 is a sectional view of the transmission, taken toward the engine, showing the internal structure of the transmission including the above mentioned shifting force conveying mechanism.

FIG. 5 shows a mechanism 50 which includes these shift pieces and conveys the shifting force. Now, this shifting force conveying mechanism 50 is described with reference to FIG. 5 and FIG. 6. FIG. 6 is a view of the transmission without the second casing 2, being looked at toward the first casing 1, but it shows detent mechanisms 52, 54 and 56, which are provided in the second casing 2, to make the description more easily understandable.

The shifting force conveying mechanism 50 is located at the upper part of the first room 8, and it comprises a LOW or SECOND shift rod 51, a THIRD or FOURTH shift fork shaft 53 and a FIFTH or SIXTH shift fork shaft 55. The right ends of these shift rod and fork shafts are supported by the first partition wall 4 while the left ends are supported by the second partition wall 5, respectively, and they are movable in the axial direction. The LOW or SECOND shift rod 51 is provided with a whirl-stop 51c and detent furrows 51a, which are used in cooperation with a detent mechanism 52 for setting one of the following three positions: specifically, LOW, NEUTRAL and SECOND. In the same way, the THIRD or FOURTH shift fork shaft 53 and the FIFTH Of SIXTH shift fork shaft 55 are provided with detent furrows 53a and 55a, respectively, which are used in cooperation with detent mechanisms 54 and 56, respectively, for setting one of the three positions: THIRD, NEUTRAL and FOURTH, and FIFTH, NEUTRAL and SIXTH, respectively.

In addition, the LOW or SECOND shift rod 51, the THIRD or FOURTH shift fork shaft 53 and the FIFTH or SIXTH shift fork shaft 55, respectively, are provided with a LOW or SECOND shift piece 61, a THIRD or FOURTH shift piece 62 and a FIFTH or SIXTH shift piece 63, which are fixed thereon. Furthermore, a REVERSE shift piece 64 is provided movably in the axial direction on the THIRD or FOURTH shift fork shaft 53. These shift pieces 61~64 include selector grooves 61a~64a, respectively, which are aligned laterally. The front end of the selector arm 43 is designed to engage one of the selector grooves 61a~64a. By moving the shift lever 41 in the X direction, the front end of the selector arm 43 is selectively engaged to one of the selector grooves 61a~64a, and by moving the shift lever 41 in the Y direction, the shift piece which has the selector groove engaged to the selector arm 43 is transferred in the axial direction.

The THIRD or FOURTH shift fork shaft 53 and the FIFTH or SIXTH shift fork shaft 55 are provided with a THIRD or FOURTH shift fork 57 and a FIFTH or SIXTH shift fork 58, respectively. The THIRD or FOURTH shift fork 57 is fixed on the THIRD or FOURTH shift fork shaft 53 and is axially slidable on the FIFTH or SIXTH shift fork shaft 55. On the other hand, the FIFTH or SIXTH shift fork 58 is fixed on the FIFTH or SIXTH shift fork shaft 55 and is axially slidable on the THIRD or FOURTH shift fork shaft 53. The THIRD or FOURTH shift fork 57 engages the THIRD or FOURTH synchro-sleeve 45, which activates the THIRD clutch 33 and the FOURTH clutch 34, while the FIFTH or SIXTH shift fork 58 engages the FIFTH or SIXTH synchro-sleeve 46, which activates the FIFTH clutch 35 and the SIXTH clutch 36. Therefore, by manipulating the shift lever 41, the selector arm 43 is engaged, for example, to the selector groove 62a or 63a of the THIRD or FOURTH shift piece 62 or the FIFTH or SIXTH shift piece 63, and then the THIRD or FOURTH shift fork shaft 53 or the FIFTH or SIXTH shift fork shaft 55 is transferred appropriately in the axial direction to selectively activate one of the THIRD~SIXTH clutches 33~36.

The LOW or SECOND synchro-sleeve 47, which activates the LOW and SECOND clutches 31 and 32, and the REVERSE synchro-sleeve 48, which activates the REVERSE clutch 37, are located on the countershaft 12 at the lower part of the transmission. Therefore, a LOW or SECOND shift fork 73 and a REVERSE shift fork 76, which engage these synchro-sleeves 47 and 48, are mounted, respectively, on a LOW or SECOND shift fork shaft 71 and a REVERSE shift fork shaft 75, which are provided movably in the axial direction at the lower part of the transmission. The LOW or SECOND shift fork 73 is fixed on the LOW or SECOND shift fork shaft 71 and is axially slidable on the REVERSE shift fork shaft 75 while the REVERSE shift fork 76 is fixed on the REVERSE shift fork shaft 75 and is axially slidable on the LOW or SECOND shift fork shaft 71.

When the LOW or SECOND shift fork shaft 71 or the REVERSE shift fork shaft 75 is transferred appropriately in the axial direction by manipulating the shift lever 41, the LOW or SECOND shift fork 73 or the REVERSE shift fork 76 moves correspondingly, and the LOW or SECOND synchro-sleeve 47 or the REVERSE synchro-sleeve 48 is transferred appropriately in the axial direction. As a result, one of the LOW, SECOND and REVERSE clutches 31, 32 and 37 can be selectively activated. In order to convey the force applied to the shift lever 41 to achieve the appropriate movement of the LOW or SECOND shift fork shaft 71 or the REVERSE shift fork shaft 75, a LOW or SECOND rocking lever 65 and a REVERSE rocking lever 66 are provided laterally in the first room 8 as detailed in FIGS. 6, 7 and 8.

These two rocking levers 65 and 66 are long plate-like members and positioned close to each other and are supported by a pair of retaining ribs 4a and 4b, which protrude from the first partition wall 4 into the first room 8. More specifically, an aperture is provided extending from the outer surface of the first casing 1 and passing through the retaining ribs 4a and 4b, and a retaining pin 67 is inserted from the outside of the casing into this aperture to support the rocking levers 65 and 66 at the center thereof as shown in FIG. 6. In this condition, each rocking lever is independently pivotable around the retaining pin 67. Because of this arrangement, the rocking levers 65 and 66 are easily mountable. They are placed between the retaining ribs 4a and 4b and then pinned with the retaining pin 67, which is inserted from the outside.

Figure 7:
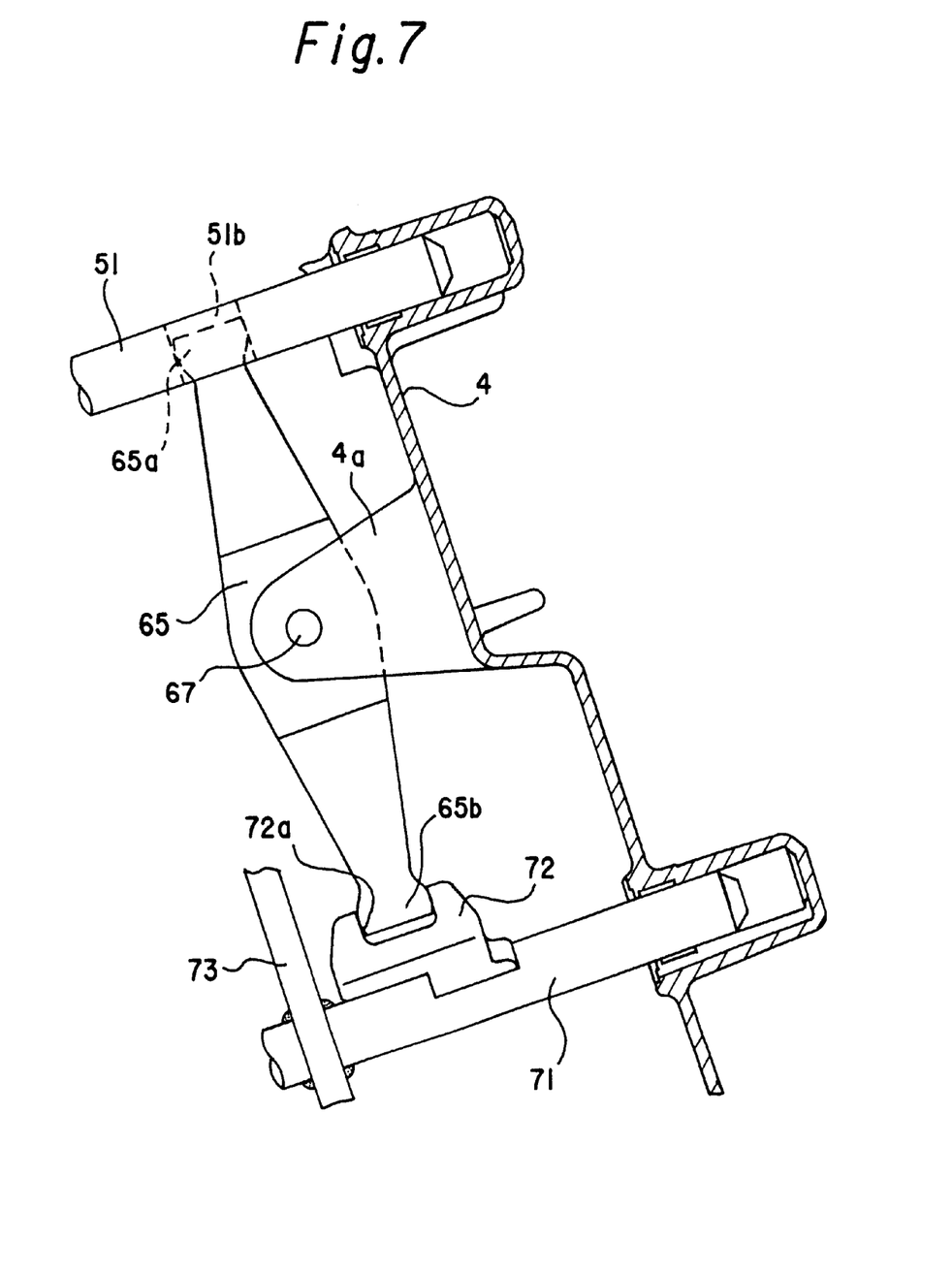
FIG. 7 is a sectional view showing the construction of a LOW or SECOND rocking lever, which constitutes a linkage conveying a shifting force.

As shown in FIG. 7, the upper end 65a of the LOW or SECOND rocking lever 65 is set in a recess 51b which is provided on the LOW or SECOND shift rod 51 while the lower end 65b is set in an engaging groove 72a which is provided on an engaging member 72 fixed on the LOW or SECOND shift fork shaft 71. In this construction, when the LOW or SECOND shift rod 51 is transferred in the axial direction by manipulating the shift lever 41, the LOW or SECOND shift fork shaft 71 is transferred in the opposite axial direction by the movement of the LOW or SECOND rocking lever 65, which movement is caused by the movement of the LOW or SECOND shift rod 51. As a result, the LOW or SECOND synchro-sleeve 47 is shifted in the axial direction correspondingly by the LOW or SECOND shift fork 73, which is fixed on the LOW or SECOND shift fork shaft 71. Thus, the LOW or SECOND clutch 31 or 32 can be activated selectively.

Figure 8:
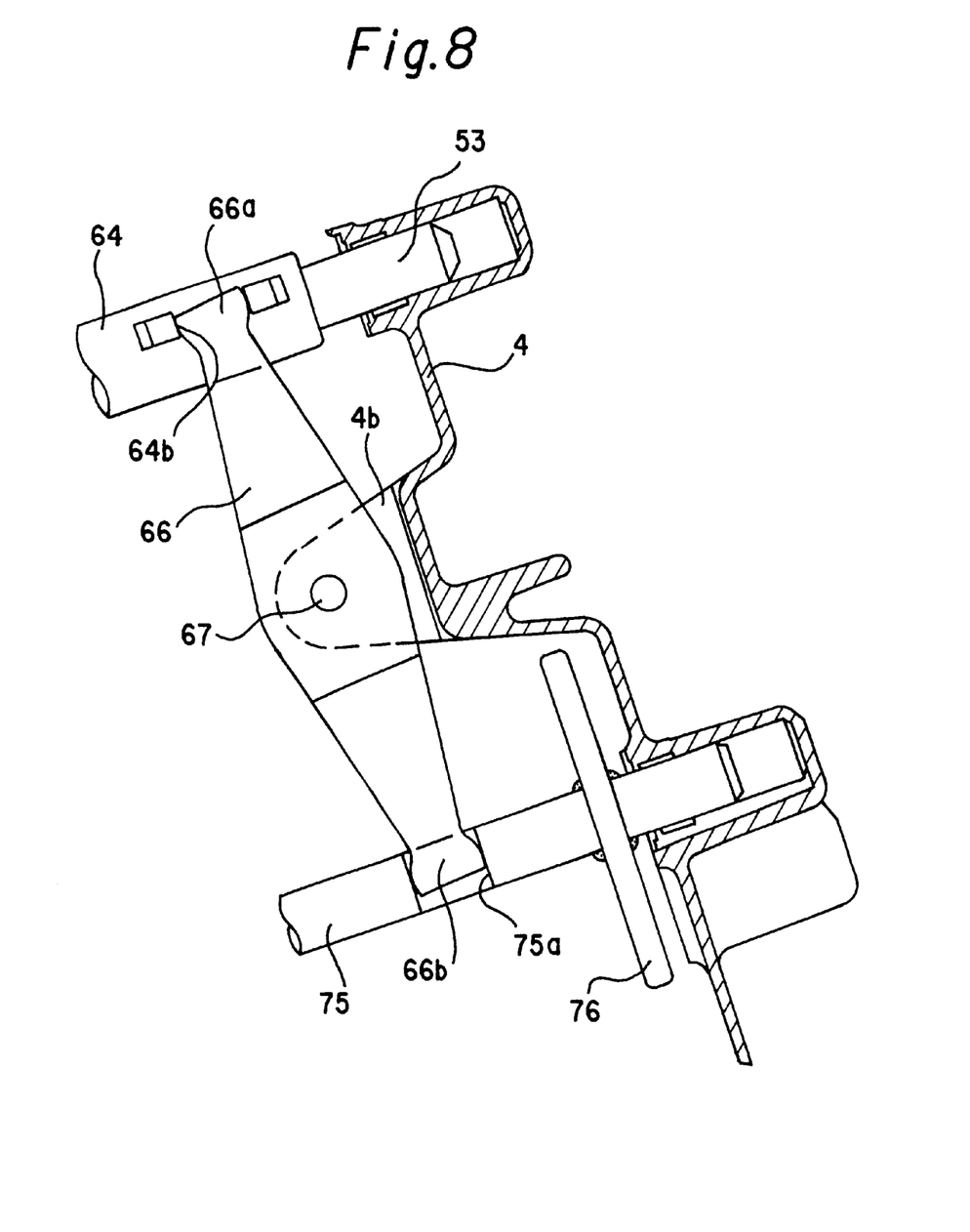
FIG. 8 is a sectional view showing the construction of a REVERSE rocking lever, which constitutes a linkage conveying a shifting force.

As shown in FIG. 8, the upper end 66a of the REVERSE rocking lever 66 is set in an engaging groove 64b which is provided in the REVERSE shift piece 64 while the lower end 66b is set in a recess 75a which is provided on the REVERSE shift fork shaft 75. In this condition, when the REVERSE shift piece 64 is transferred in the axial direction on the THIRD or FOURTH shift fork shaft 53, the REVERSE shift fork shaft 75 is transferred in the opposite axial direction by the movement of the REVERSE rocking lever 66, which is caused by the transfer of the REVERSE shift piece 64. As a result, the REVERSE synchro-sleeve 48 is shifted in the axial direction correspondingly by the REVERSE shift fork 76, which is fixed on the REVERSE shift fork shaft 75, to activate the REVERSE clutch 37.

Now, a description is made of the lubrication system of the transmission. As shown in FIGS. 2 and 3, a passage 111 for leading lubrication oil is provided extending axially inside the input shaft 11, and a plurality of release passages 112 are provided extending radially from this lubrication passage 111 to the outer surface of the input shaft 11. As shown in FIGS. 3 and 4, a lubrication passage 131 is also provided extending axially in the output shaft 13, and a plurality of release passages 132 are provided extending radially from this lubrication passage 131 to the outer surface of the output shaft 13. These release passages 112 and 132 are positioned such that their outlets are located close to bearings, gears, etc, respectively.

Figure 9:
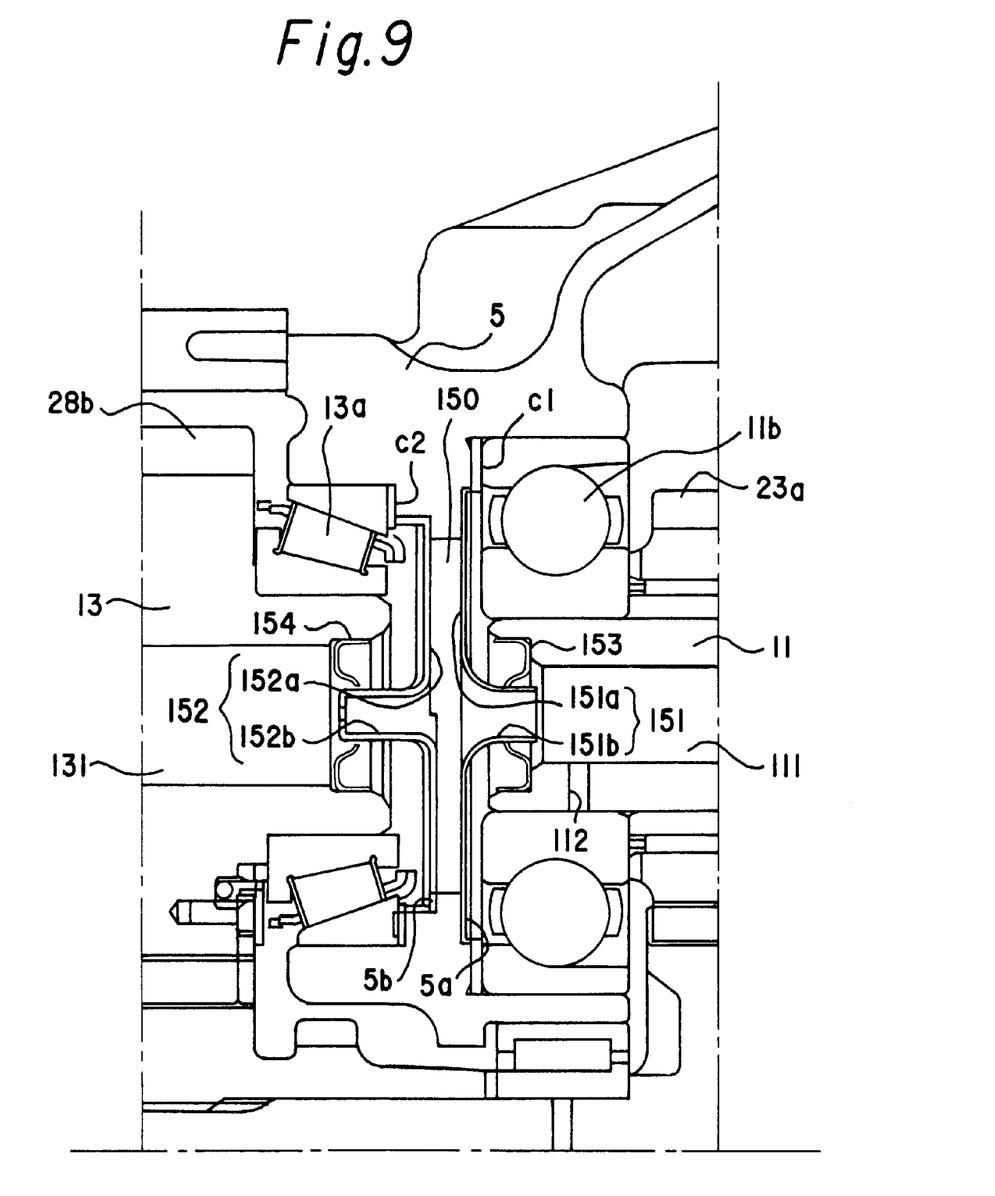
FIG. 9 is a sectional view showing structural members defining an oil chamber.

As shown in FIG. 9, a cylindrical oil chamber 150 is defined by the left end of the input shaft 11 and the right end of the output shaft 13, both the ends of which shafts are positioned in the second partition wall 5. This oil chamber 150 includes first and second oil guides 151 and 152.

The first oil guide 151 comprises a disk-shaped support portion 151a and a cylindrical portion 151b, which extends perpendicularly from the support portion 151a. The support portion 151a is fit in a disk-shaped recess 5a which is provided in the second partition wall 5 and is held by a clip c1 which is pressed by the bearing 11b leftward. In this condition, the support portion 151a will not experience any radial deformation. On the other hand, the right end of the cylindrical portion 151b is positioned in the left end opening of the lubrication passage 111 of the input shaft 11.

In a similar way, the second oil guide 152 comprises a disk-shaped support portion 152a and a cylindrical portion 152b, which extends perpendicularly from the support portion 152a. The support portion 152a is fit in a disk-shaped recess 5b which is provided in the second partition wall 5 and is held by a clip c2 which is pressed by the bearing 13a rightward. In this condition, the support portion 151a will not experience any radial deformation. On the other hand, the left end of the cylindrical portion 152b is positioned in the right end opening of the lubrication passage 131 of the output shaft 13. In this construction, the clips c1 and c2, which are used for supporting the bearings 11b and 13a, are also used to retain the first and second oil guides 151 and 152. Therefore, there is no need of special parts for the purpose of retaining these oil guides. Moreover, these oil guides can be installed very easily.

These oil guides are formed such that the open area provided at the end of the cylindrical portion 15 1b of the first oil guide 151 is larger than that of the cylindrical portion 152b of the second oil guide 152 (the reason is explained later). Also, the outer diameter of the support portion 151a of the first oil guide 151 and the inner diameter of the recess 5a of the second partition wall 5 are larger than those of the support portion 152a of the second oil guide 152 and the recess 5b of the second partition wall 5. This is to prevent these two different oil guides from being mounted interchangeably. Because the opening of the cylindrical portion 152b of the second oil guide 152 is relatively small, it is preferable that the second oil guide 152 be molded from a resin to make its production or shaping substantially simple.

A first end plate 153, which has a circular orifice at the center thereof, is provided fittingly in the left end opening of the lubrication passage 111. Therefore, the cylindrical portion 151b of the first oil guide 151 is disposed passing through this orifice. There is a little clearance between the cylindrical portion 151b and the orifice, so the cylindrical portion 151b of the first oil guide 151 will not come into contact with the first end plate 153. Even when the input shaft 11 is rotated, these members 151 and 153 will not interfere with each other.

A second end plate 154, which has a circular orifice at the center thereof, is provided fittingly in the right end opening of the lubrication passage 131. Therefore, the cylindrical portion 152b of the second oil guide 152 is disposed passing through this orifice. There is a little clearance between the cylindrical portion 152b and this orifice, so the cylindrical portion 152b of the second oil guide 152 will not come into contact with the second end plate 154. Even when the output shaft 13 is rotated, these members 152 and 154 will not interfere with each other.

Figure 10:
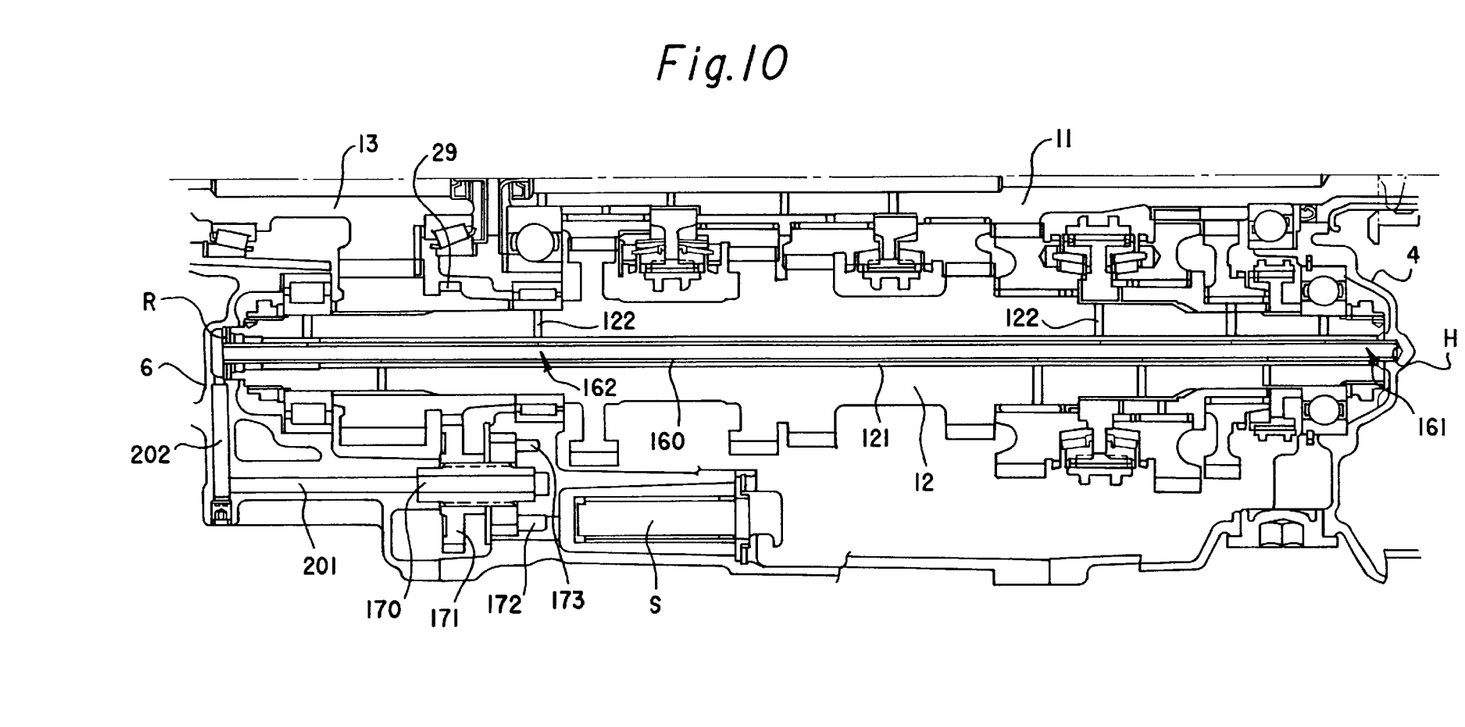
FIG. 10 is a sectional view showing the construction of the transmission, which incorporates a countershaft.

As shown in FIG. 10, a lubrication passage 121 is provided axially passing through the countershaft 12, and a plurality of release passages 122 are provided extending radially from this lubrication passage 121 to the outer surface of the countershaft 12. These release passages 122 are positioned such that their outlets are located close to bearings, gears, etc. which are provided to support the countershaft 12 rotatably.

As shown in FIG. 10, an oil pipe 160 is provided inside the release passages 122 of the countershaft 12. The right end of this oil pipe 160 is press-fit and fixed in an indentation H which is provided in the first partition wall 4 while the left end is mounted in a ring R which is press-fit and fixed in the cover wall 6. This ring restricts radial deformation of the oil pipe 160. Even when the countershaft 12 is rotated, the oil pipe 160 is kept stationary in the lubrication passage 121 (refer also to FIG. 2 and FIG. 4). The oil pipe 160 includes communicating holes 161 which are provided at the rightmost end of the lubrication passage 121 and communicating holes 162 which are provided at the positions where the release passages 122 of the countershaft 12 are located as shown in FIGS. 2, 3 and 4.

Figure 11:
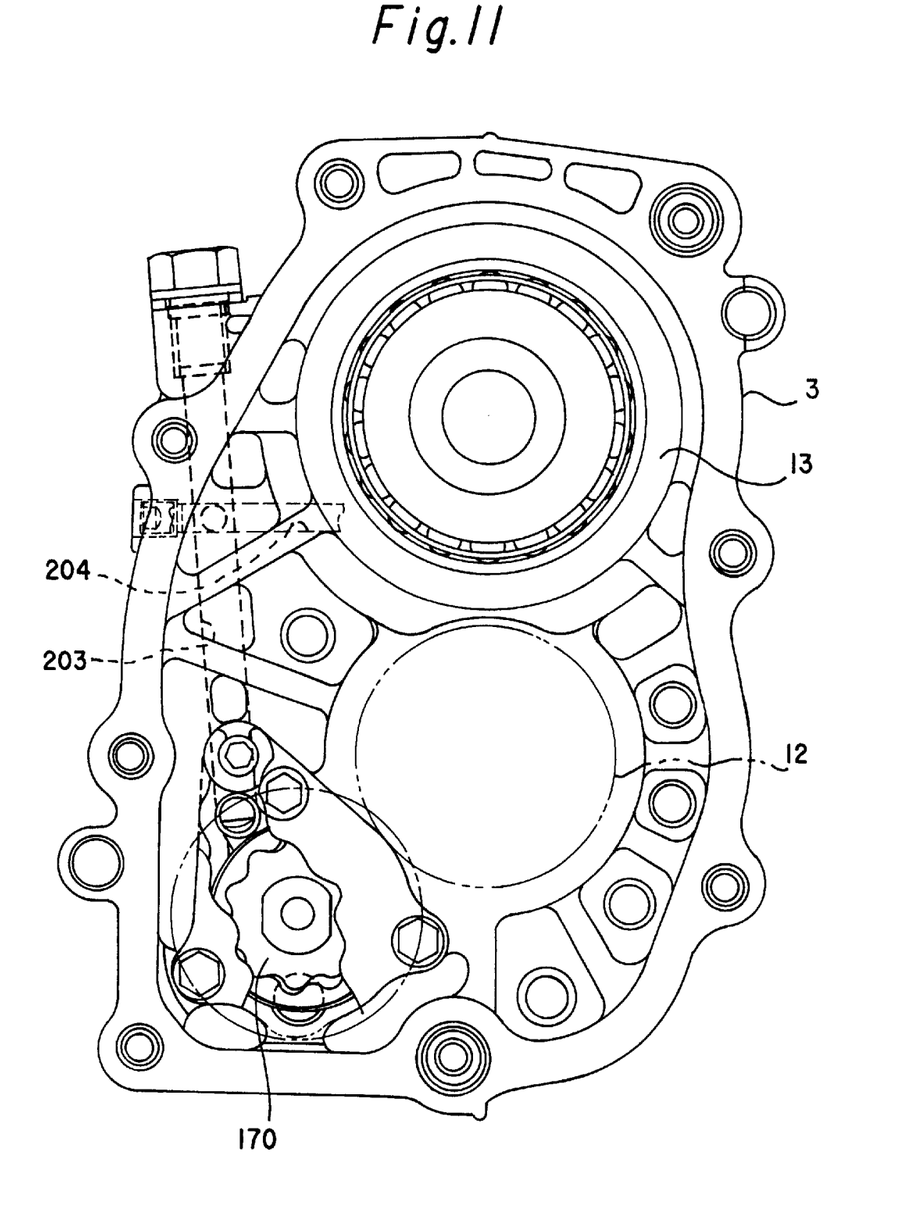
FIG. 11 is a sectional view of the transmission, taken toward the engine, showing the internal structure of the transmission including a hydraulic pump.

As shown in FIG. 10, a hydraulic pump 170 for supplying lubrication oil is provided under the oil chamber 150 (refer also to FIG. 11), and the drive gear 171 of the hydraulic pump 170 is arranged to mesh with a gear 29 which is disposed on the countershaft 12. Thus, the hydraulic pump 170 is driven by the rotation of the countershaft 12 to suck oil from an oil tank (not shown) through a strainer S and an inlet 172 and to discharge it as lubrication oil through an outlet 173. The hydraulic pump 170 is positioned there, so that the oil discharged from the hydraulic pump 170 is led into the input shaft 11, the output shaft 13 and the countershaft 12 through shortest routes possible (this will be described later in detail).

As shown in FIG. 10, part of the lubrication oil discharged to the outlet 173 is led through oil passages 201 and 202 into the left end of the oil pipe 160. The lubrication oil led to the left end of the oil pipe 160 then flows through the oil pipe 160 to the right end thereof. On the way to the right end, part of the oil leaks through the communicating holes 162, which are perforations provided to the oil pipe 160 as explained above, to the lubrication passage 121 because of the pressure exerted by the hydraulic pump 170. The lubrication oil which has reached the right end of the oil pipe 160 is led through the communicating holes 161 also to the lubrication passage 121.

The lubrication oil which is discharged to the lubrication passage 121 in this way is then led through the release passages 122 of the countershaft 12 to the outside of the countershaft 12 by the centrifugal force which is generated by the rotation of the countershaft 12. As a result, the parts such as bearings and gears which are provided on the countershaft 12 are lubricated sufficiently and effectively.

As mentioned previously, the oil pipe 160 is fixed on the first partition wall 4 and the cover wall 6, so the lubrication oil inside the oil pipe 160 is not affected by the centrifugal force generated from the rotation of the countershaft 12 and flows from the left end to the right end of the oil pipe 160 smoothly. Because of this arrangement, the bearings, gears, etc. which are located to the right side of the countershaft 12 can receive a sufficient amount of lubrication oil. Many FR drive transmissions are designed to have an inclination descending from the engine side to the rear wheel side. In such cases, the above mentioned oil pipe arrangement is very effective for providing lubrication.

Furthermore, it is possible to adjust the flow of lubrication oil through each of the release passages 122 by modifying the open areas of the communicating holes 162, which are provided to the oil pipe 160 at the positions where the respective communicating holes 162 face the corresponding release passages 122. Therefore, it is preferable that the open areas of the communicating holes 162 which correspond to the release passages 122 leading to members that require sufficient lubrication, for example, bearings and gears, be made larger than those of the other communicating holes 162, to lead the lubrication oil in a greater amount. In this transmission, the open areas of the communicating holes 162 which lead the lubrication oil to the synchro-mesh clutches 31~37 and the synchro-sleeves 45~48 are made larger than those of the other communicating holes 162.

In this lubrication system, part of the lubrication oil discharged to the outlet 173 is also led through oil passages 203 and 204 which are provided in the second and third casings 2 and 3, respectively, into the oil chamber 150, which is described previously (refer to FIG. 11). The lubrication oil supplied into the oil chamber 150 is divided and led by the cylindrical portions 151b and 152b of the first and second oil guides 151 and 152 into the lubrication passage 111 of the input shaft 11 and into the lubrication passage 131 of the output shaft 13, respectively.

The lubrication oil led into the lubrication passage 111 of the input shaft 11 is then led through the release passages 112 to the outside of the input shaft 11 by the centrifugal force generated from the rotation of the input shaft 11 to lubricate the bearings, gears, etc. which are provided on the input shaft 11. On the other hand, the lubrication oil led into the lubrication passage 131 of the output shaft 13 is then led through the release passages 132 to the outside of the output shaft 13 by the centrifugal force generated from the rotation of the output shaft 13 to lubricate the bearings, gears, etc. which are provided on the output shaft 13.

As previously mentioned, the open area of the cylindrical portion 151b of the first oil guide 151 is formed larger than that of the cylindrical portion 152b of the second oil guide 152. Because of this difference, the lubrication oil flowing into the oil chamber 150 flows into the lubrication passage 111 of the input shaft 11 in an amount larger than that flowing into the lubrication passage 131 of the output shaft 13. In this way, a larger amount of lubrication oil is supplied to the rotational members that require sufficient lubrication such as bearings and gears which are disposed on the input shaft 11, on which such members are provided more in number than on the output shaft 13, as shown in FIG. 1.

By adjusting the ratio of the open area of the cylindrical portion 151b of the first oil guide 151 to that of the cylindrical portion 152b of the second oil guide 152, it is possible to determine a ratio appropriate for the amounts of lubrication oil which is supplied into the lubrication passage 111 of the input shaft 11 and which is supplied into the lubrication passage 131 of the output shaft 13. Therefore, the lubrication arrangement of the present invention is especially effective for lubricating a transmission which has such members as bearings and gears disposed on the input shaft 11 and the output shaft 13 in different numbers. Moreover, the lubrication arrangement of the present invention enables a lubrication system to supply lubrication oil to a lubrication passage 111 provided in the input shaft 11 and to a lubrication passage 131 provided in the output shaft 13 only by supplying lubrication oil to an oil chamber 150 which is provided between the input shaft 11 and the output shaft 13. This is an advantage which realizes a compact lubrication system.

As described previously, the clearance between the first end plate 153 and the cylindrical portion 151b of the first oil guide 151 and the clearance between the second end plate 154 and the cylindrical portion 152b of the second oil guide 152 are very small. Therefore, even though some lubrication oil may flow back from the lubrication passage 111 of the input shaft 11 and from the lubrication passage 131 of the output shaft 13, it cannot escape out of the input shaft 11 and the output shaft 13 easily. As a result, the lubrication oil supplied into the lubrication passages 111 and 131 will flow surely through the release passages 112 and 132 for lubrication.

Figure 12:
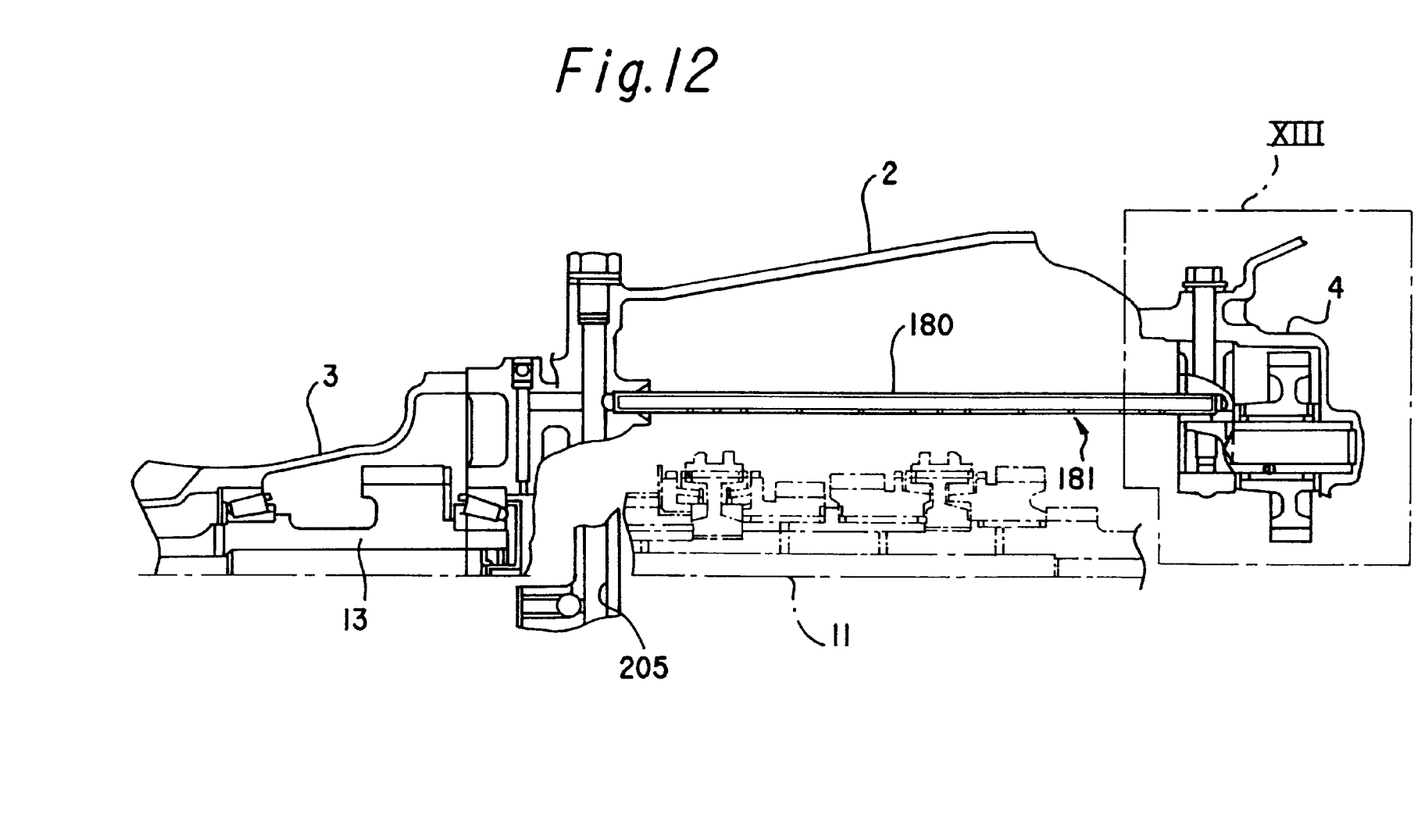
FIG. 12 is a sectional view showing the construction of a shower pipe.

In addition, part of the lubrication oil discharged from the outlet 173 is led through an oil passage 205 which is provided in the second casing 2 into a shower pipe 180 as shown in FIG. 12. The shower pipe 180 is disposed in parallel with and beside the input shaft 11 and the output shaft 13 as shown in FIG. 6 and FIG. 12. The lubrication oil which is supplied through the oil passage 205 into the shower pipe 180 is sprayed through a plurality of outlets 181 which are provided through the lateral side of the shower pipe 180. The lubrication oil is sprayed like a shower to lubricate rotational members, especially gears, which are provided on the input shaft 11 and the output shaft 13.

Figure 13:
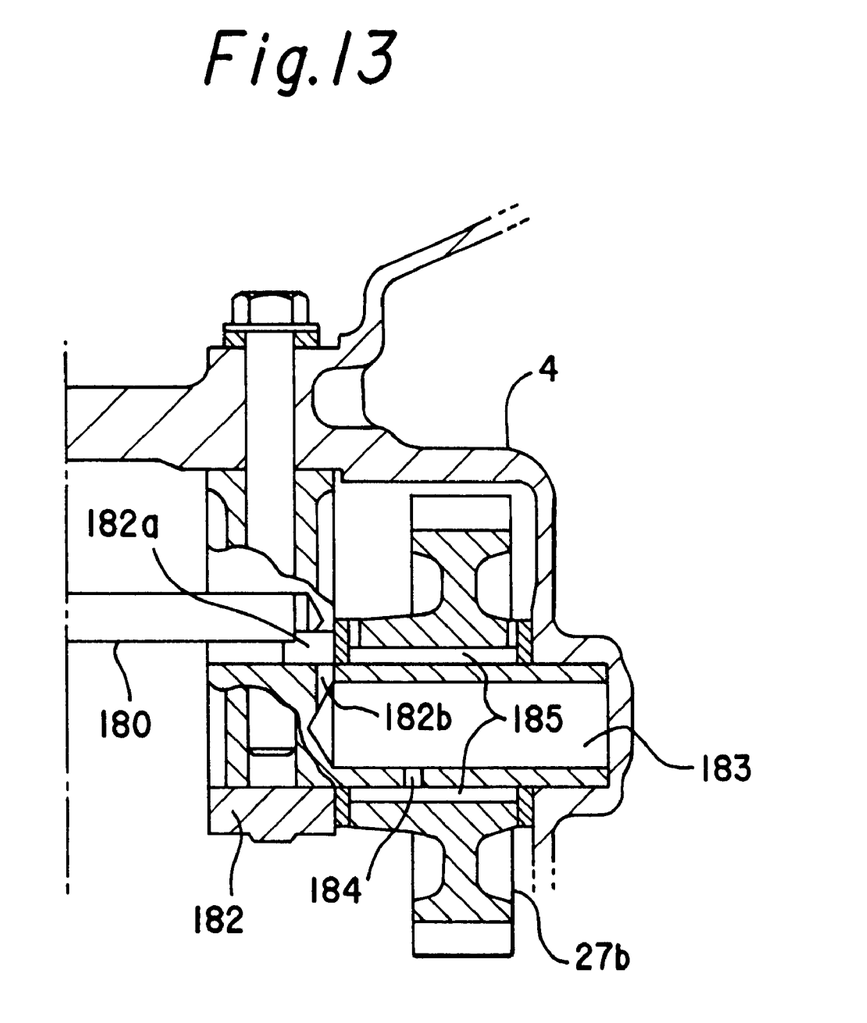
FIG. 13 is an enlarged sectional view showing the part indicated by "VIII" in FIG. 12.

The right end of the shower pipe 180 is supported by a support member 182 which also support rotationally one end of the above mentioned idle gear 27b as shown in FIG. 13. The lubrication oil led from the left end to the right end of the shower pipe 180 in FIG. 12 is then led through lubrication passages 182a and 182b which are provided in the support member 182 and then through a lubrication passage 183 and a release passage 184 which are provided in the idle gear 27b, and it is discharged in the idle gear 27b to lubricate a bearing 185, etc. which support the idle gear 27b rotationally.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.11-042840 filed on Feb. 22, 1999, which is incorporated herein by reference.

What is claimed is:

1. A lubrication arrangement in a transmission which incorporates a first rotational shaft and a second rotational shaft disposed such that one end of said first rotational shaft faces one end of said second rotational shaft, comprising:

a first lubrication passage which is provided extending axially inside said first rotational shaft with an opening at said one end thereof;

a second lubrication passage which is provided extending axially inside said second rotational shaft with an opening at said one end thereof;

a conduit which leads lubrication oil that is supplied from a source of lubrication oil to a space between said two openings of said first and second rotational shafts;

an oil chamber which is provided between said two openings and functions as a point where the lubrication oil led therein through said conduit is portioned out to said first lubrication passage and to said second lubrication passage:

a first oil guide which is provided in said oil chamber and functions to set an amount of lubrication oil flowing into said first lubrication passage; and a second oil guide which is provided in said oil chamber and functions to set an amount of lubrication oil flowing into said second lubrication passage, wherein each of said first and second oil guides comprises a disk-shaped support portion and a cylindrical portion which extends perpendicularly from a central part of said support portion, which is fixed on a member constituting said oil chamber, wherein said cylindrical portion of said first oil guide extends into said first lubrication passage while said cylindrical portion of said second oil guide extends into said second lubrication passage, and wherein an open area which is provided at said cylindrical portion of said first oil guide and an open area which is provided at said cylindrical portion of said second oil guide are determined to set a ratio for the amounts of lubrication oil that are portioned out to said first lubrication passage and to said second lubrication passage.

2. The lubrication arrangement as set forth in claim 1, wherein said first rotational shaft includes a release passage which extends from said first lubrication passage and opens at an outer surface of said first rotational shaft, wherein said second rotational shaft includes a release passage which extends from said second lubrication passage and opens at an outer surface of said second rotational shaft, and wherein the lubrication oil is discharged through said release passages to lubricate members which are disposed on said first and second rotational shafts.

3. The lubrication arrangement as set forth in claim 1, wherein at least one of said first and second oil guides is molded from a resin.

4. The lubrication arrangement as set forth in claim 1, wherein said support portions of said first and second oil guides have outer diameters different from each other to prevent said first and second oil guides from being mounted interchangeably to respective positions in said oil chamber.

5. The lubrication arrangement as set forth in claim 1, wherein first and second end plates, each of which has a centrally located orifice, are fixed to said end openings of said first and second lubrication passages, respectively, and wherein said cylindrical portions of said first and second oil guides are inserted in said orifices of said first and second end plates, respectively, with a small clearance.

6. The lubrication arrangement as set forth in claim 1, wherein said first and second oil guides are held in position by clips which are pushed by bearings, respectively.

* * * * *